(12) United States Patent
Martinez et al.

(10) Patent No.: US 11,954,829 B2
(45) Date of Patent: Apr. 9, 2024

(54) VIDEOCONFERENCING SYSTEM ALLOWING A PARALLAX EFFECT ASSOCIATED WITH THE DIRECTION OF THE GAZE OF A USER TO BE DECREASED

(71) Applicant: Commissariat à l'Energie Atomique et aux Energies Alternatives, Paris (FR)

(72) Inventors: Christophe Martinez, Grenoble (FR); François Templier, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 154 days.

(21) Appl. No.: 17/742,884

(22) Filed: May 12, 2022

(65) Prior Publication Data

US 2022/0366545 A1 Nov. 17, 2022

(30) Foreign Application Priority Data

May 14, 2021 (FR) ..................... 21 05085

(51) Int. Cl.
*G06T 5/00* (2006.01)
*G06T 5/50* (2006.01)
(Continued)

(52) U.S. Cl.
CPC ............... *G06T 5/005* (2013.01); *G06T 5/50* (2013.01); *H04L 65/403* (2013.01); *H04N 23/56* (2023.01);
(Continued)

(58) Field of Classification Search
CPC . G06T 5/005; G06T 5/50; G06T 2207/30201; H04L 65/403; H04N 23/56;
(Continued)

(56) References Cited

U.S. PATENT DOCUMENTS 6,771,303 B2 * 8/2004 Zhang .................... H04N 7/144
                                                           382/118
10,423,830 B2    9/2019 Chalom et al.
(Continued)

OTHER PUBLICATIONS

French Preliminary Search Report dated Dec. 8, 2021 in French Application 21 05085 filed on May 14, 2021, 9 pages (with English Translation of Categories of Cited Documents & Written Opinion).

*Primary Examiner* — Yosef K Laekemariam
(74) *Attorney, Agent, or Firm* — Oblon, McClelland, Maier & Neustadt, L.L.P.

(57) ABSTRACT

The invention relates to a videoconferencing system 1, comprising:
  a display screen 10, for displaying an image $I_e(t_i)$ containing N images $I_{int}^{(k)}(t_i)$;
  a camera 20, for acquiring an image $I_c(t_j)$;
  a single-pixel-imager-employing optical device suitable for determining N images $I_{co}^{(k)}(t_j)$ on the basis of sub-matrices $SM_{imp}^{(k)}(t_j)$ comprising:
    an optical source 31, suitable for irradiating an ocular portion $P_o(t_j)$ of the face of the user;
    a matrix of single-pixel imagers that are suitable for reconstructing a correction image $I_{co}^{(k)}(t_j)$ on the basis of the light beam reflected by the ocular portion $P_o(t_j)$;
  a processing unit 40, suitable for:
    determining, in each image $I_{int}^{(k)}(t_i)$ of the image $I_e(t_i)$, a target point $P_c^{(k)}(t_j)$, then selecting N sub-matrices $SM_{imp}^{(k)}(t_j)$ each centred on a target point $P_c^{(k)}(t_j)$;
    correcting the image $I_c(t_j)$, by replacing a region of the image $P_c(t_j)$ representing the ocular portion $P_o(t_j)$ with the N images $I_{co}^{(k)}(t_j)$.

9 Claims, 6 Drawing Sheets

(51) Int. Cl.
*H04L 65/403* (2022.01)
*H04N 23/56* (2023.01)
*H04N 23/90* (2023.01)

(52) U.S. Cl.
CPC ... *H04N 23/90* (2023.01); *G06T 2207/30201* (2013.01)

(58) Field of Classification Search
CPC .......... H04N 23/90; H04N 7/144; H04N 7/15; H04N 7/142
USPC ...................................................... 381/14.08
See application file for complete search history.

(56) References Cited

U.S. PATENT DOCUMENTS

| | | | |
|---|---|---|---|
| 2017/0308734 A1* | 10/2017 | Chalom | G06F 18/24 |
| 2021/0021785 A1 | 1/2021 | Cutler | |
| 2021/0105434 A1 | 4/2021 | Kimura et al. | |

* cited by examiner

VIDEOCONFERENCING SYSTEM ALLOWING A PARALLAX EFFECT ASSOCIATED WITH THE DIRECTION OF THE GAZE OF A USER TO BE DECREASED

TECHNICAL FIELD

The field of the invention is that of videoconferencing systems allowing remotely located individuals to communicate with one another. Such videoconferencing systems are suitable for transmitting/receiving multimedia streams (formed from video and audio signals) between one another and in real time.

PRIOR ART

Videoconferencing systems are increasingly used to allow remotely located individuals to communicate with one another in real time. These systems transmit and receive multimedia streams (audio and video signals) corresponding to the image and to the sound of the communicating individuals. Such a videoconferencing system conventionally comprises a display screen for displaying the interlocutors, a camera for filming the user, and a processing unit.

However, it is known that eye contact plays an important role in the quality of interpersonal communication. Eye contact is said to be made when two communicating individuals look each other in the eyes (direct visual contact). However, in a conventional videoconferencing system, the camera is conventionally offset with respect to the display screen, and as a result the user does not appear to look the interlocutor in the eyes.

Parallax is then spoken of, as indicated in the article by Bohannon et al. titled *Eye contact and video-mediated communication*: A review Displays Vol. 34, Issue 2, 177-185 (2012), this parallax effect resulting from the non-zero angle, which is for example larger than 5°, called the parallax angle or parallax error, between the directional axis of the gaze of the user when he looks at the eyes of the interlocutor, and the optical axis of the camera passing through the eyes of the user. To avoid this parallax effect, it would be necessary for the user to look directly at the camera and not at the interlocutor, but this is not conceivable in the context of human communications.

Various videoconferencing systems exist that attempt to decrease or even remove the effect of parallax between the communicating individuals. Thus, document U.S. Pat. No. 7,126,627B1 describes a videoconferencing system comprising a movable camera that is positioned between the user and the display screen, thus decreasing parallax angle. However, the presence of the camera in front of the display screen may distract the user. Another solution is described in document WO2019/165124A1, the display screen of the videoconferencing system of which also incorporates a matrix-array imager formed from a matrix of matrix-array imagers. Thus, each pixel of the display screen comprises a light-emitting diode and a matrix-array image sensor, this resulting in a particularly complex electronic configuration.

SUMMARY OF THE INVENTION

The objective of the invention is to at least partially remedy the drawbacks of the prior art, and more particularly to provide a videoconferencing system that allows a parallax effect associated with the direction of the gaze of a user communicating with an interlocutor displayed on his screen while looking him in the eyes to be effectively decreased, without unreasonably increasing the complexity of the electronic configuration of the display screen.

To this end, one subject of the invention is a videoconferencing system, suitable for transmitting and receiving multimedia signals to and from N remote videoconferencing systems, with $N \geq 1$, allowing a user to communicate in real time with N interlocutors using these remote systems, comprising:
- a display screen, comprising a matrix of emissive pixels that is suitable for displaying, at various successive display times $t_i$, an image $I_e(t_i)$ containing N images $I_{int}^{(k)}(t_i)$ transmitted by the remote systems and depicting the face of the interlocutors;
- a camera, suitable for acquiring, at various successive acquisition times $t_j$, an image $I_c(t_j)$ of the face of the user.

According to the invention, the videoconferencing system comprises:
- an optical device comprising single-pixel imagers, suitable for determining N correction images $I_{co}^{(k)}(t_j)$ on the basis of sub-matrices $S_{imp}^{(k)}(t_j)$ of at least one single-pixel imager, at the various acquisition times $t_1$, comprising:
    - at least one optical source, suitable for emitting a light beam of wavelength located outside of the visible spectrum and that irradiates a predefined angular region $Z_a$ covering an ocular portion $P_o(t_j)$ of the face of the user containing his eyes;
    - a matrix of single-pixel imagers, each suitable for collecting a part of the irradiating light beam reflected by the ocular portion $P_o(t_j)$ and for reconstructing a correction image $I_{co}^{(k)}(t_j)$ on the basis of the collected light beam, and each comprising a single photosensitive region, the photosensitive regions being integrated into the display screen and located in a main region of the display screen, in which main region the N images $I_{int}^{(k)}(t_j)$ of the interlocutors are located;
- a processing unit, suitable for:
    - determining, in each image $I_{int}^{(k)}(t_j)$ of the image $I_e(t_i)$, a target point $P_c^{(k)}(t_j)$ located at the eyes of the interlocutor (i.e. in the region of said eyes), then selecting N sub-matrices $SM_{imp}^{(k)}(t_j)$ each centred on a target point $P_c^{(k)}(t_j)$;
    - correcting the image $I_c(t_j)$ by replacing a region of the image $I_c(t_j)$ depicting the ocular portion $P_o(t_j)$ with the N correction images $I_{co}^{(k)}(t_j)$, thus obtaining N corrected images $I_{cc}(t_j)$ each to be transmitted to the remote system of the corresponding interlocutor.

The following are some preferred but non-limiting aspects of this videoconferencing system.

The matrix-array of single-pixel imagers may have a resolution equal to the resolution of the matrix-array of emissive pixels.

The region $I_{c\_po}(t_j)$ of the image $I_c(t_j)$ representing the ocular portion $P_o(t_j)$ and replaced by a correction image $I_{co}^{(k)}(t_j)$ may have a resolution higher than the resolution of a region $I_{c\_br}(t_j)$ of the image $I_c(t_j)$ encircling the region $I_{c\_po}(t_j)$.

The region $I_{c\_br}(t_j)$ of the image $I_c(t_j)$ may have a resolution lower than a native resolution of the image $I_c(t_j)$ during its acquisition by the camera.

The optical source may be suitable for emitting a light beam that spatially scans the angular region $Z_a$ in a scan time T, the one or more single-pixel imagers of the N sub-matrices $SM_{imp}^{(k)}(t_j)$ being suitable for performing $n_i \times p_i$ acquisitions during the scan time T.

The optical source may, as a variant, comprise a matrix-array optical modulator and be suitable for irradiating the entire angular region $Z_a$ simultaneously.

The invention also relates to a method for videoconferencing with a user by means of the videoconferencing system according to any one of the above features, comprising the following steps:
- receiving N images $I_{int}^{(k)}(t_j)$ transmitted by the remote systems of the interlocutors;
- at various display times $t_i$, displaying, with the display screen, an image $I_e(t_j)$ containing the images $I_{int}^{(k)}(t_j)$;
- determining N target points $P_c^{(k)}(t_j)$ each located at the eyes of one interlocutor (in the region of the eyes);
- determining N sub-matrices $SM_{imp}^{(k)}(t_j)$ of at least one single-pixel imager, said sub-matrices each being centred on one determined target point $P_c^{(k)}(t_j)$;
- acquiring an image $I_c(t_j)$ of the face of the user with the camera at various acquisition times $t_j$;
- determining an angular region $Z_a$ covering an ocular portion $P_o(t_j)$ of the face of the user containing his eyes;
- emitting with the optical source a light beam of wavelength located outside of the visible spectrum and that irradiates the angular region $Z_a$;
- determining N correction images $I_{co}^{(k)}(t_j)$ on the basis of sub-matrices $SM_{imp}^{(k)}(t_j)$ the one or more single-pixel imagers of which collect a part of the emitted light beam reflected by an ocular portion $P_o(t_j)$ of the face of the user, which ocular portion is located in the angular region $Z_a$;
- correcting the image $I_c(t_j)$ acquired by the camera, by replacing a region containing the ocular portion $P_o(t_j)$ with the N correction images $I_{co}^{(k)}(t_j)$, and thus obtaining N corrected images $I_{cc}(t_j)$;
- transmitting the N corrected images $I_{cc}(t_j)$, each to the remote system of the corresponding interlocutor.

The angular region $Z_a(t_j)$ may be determined on the basis of a reference point $P_u(t_j)$ determined in the image $I_c(t_j)$ acquired by the camera and associated with the eyes of the user.

Single-pixel imagers that do not belong to the determined N sub-matrices $SM_{imp}^{(k)}(t_j)$ may not imp J be activated in the step of emitting the light beam.

BRIEF DESCRIPTION OF THE DRAWINGS

Other aspects, aims, advantages and features of the invention will become more clearly apparent on reading the following detailed description of preferred embodiments thereof, this description being given by way of non-limiting example and with reference to the appended drawings, in which.

DETAILED DESCRIPTION OF PARTICULAR EMBODIMENTS

In the figures and in the remainder of the description, the same references have been used to designate identical or similar elements. In addition, the various elements have not been shown to scale for the sake of clarity of the figures. Moreover, the various embodiments and variants are not mutually exclusive and may be combined with one another. Unless indicated otherwise, the terms "substantially", "about" and "of the order of" mean to within 10%, and preferably to within 5%. Moreover, the terms "comprised between . . . and . . . " and equivalents mean inclusive of limits, unless indicated otherwise.

Figure 1:
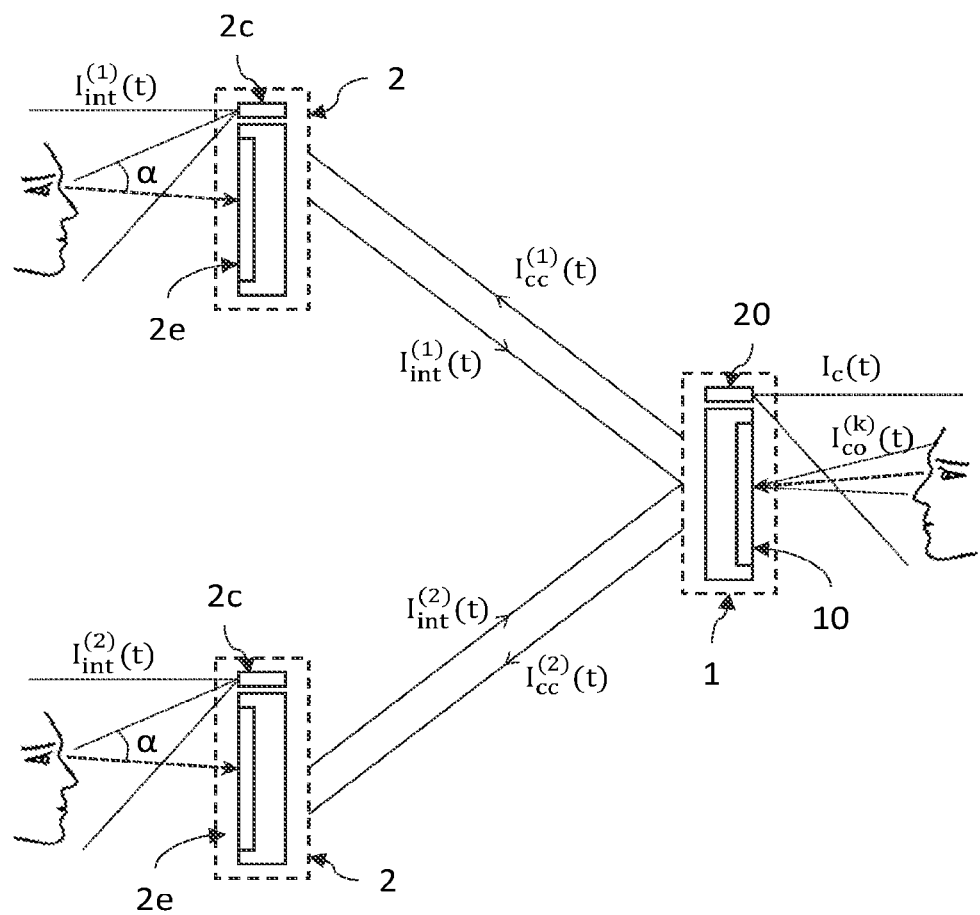
FIG. 1 is a schematic and partial cross-sectional view of remotely located individuals communicating with one another via videoconferencing systems, a user here employing a videoconferencing system according to one embodiment to communicate with two interlocutors using remote videoconferencing systems representative of the prior art.
Figure 2:
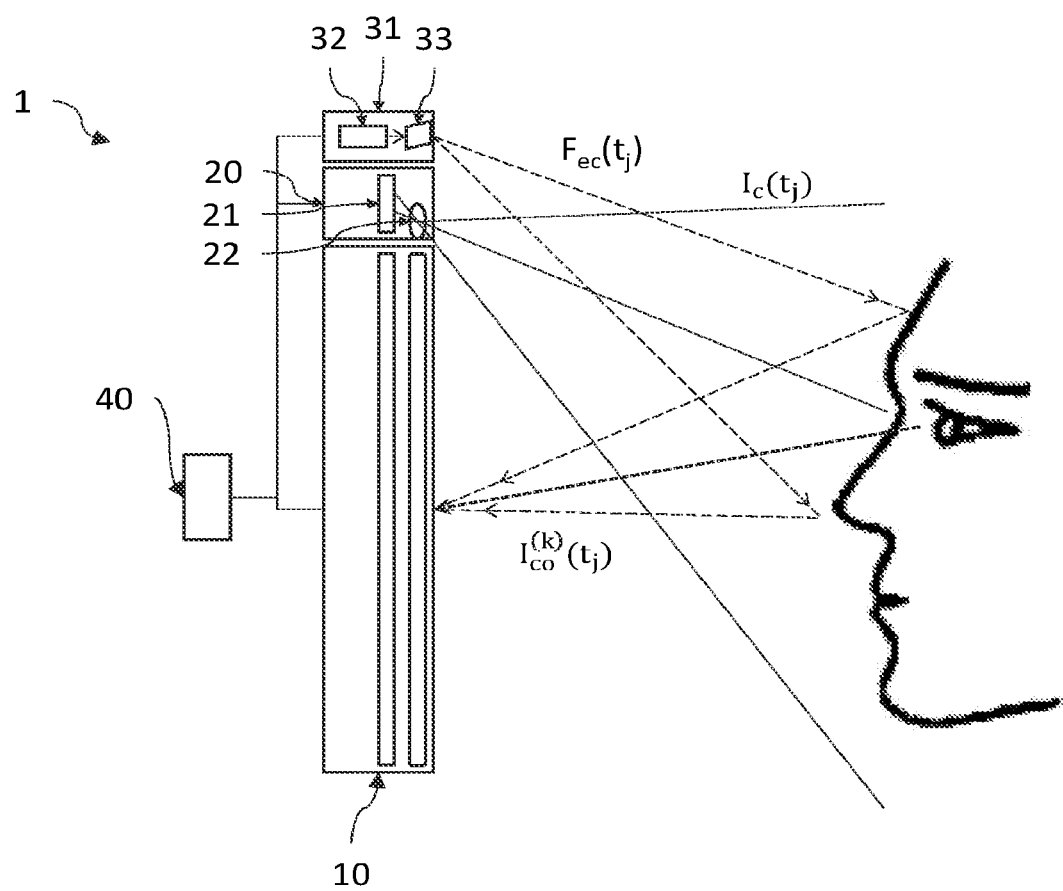
FIG. 2 is a schematic and partial cross-sectional view of a videoconferencing system according to one embodiment and of its user.

FIGS. 1 and 2 are schematic views of a videoconferencing system 1 according to one embodiment, allowing a user to communicate in real time with N interlocutors, each interlocutor using a videoconferencing system 2 that below is referred to as a 'remote system'. The number N of interlocutors is at least equal to 1, and is here equal to 2 (although it may be higher, and for example equal to 10 or more). This videoconferencing system 1 allows a parallax effect, and therefore the value of an angle α associated with the direction of the gaze of the user, when this user is communicating with an interlocutor displayed on the display screen 10 while looking him in the eyes, to be decreased. In other words, the interlocutor in question sees the user actually looking at him in the eyes. In contrast, the remote systems 2 are here representative of the prior art, and therefore do not allow this parallax effect to be decreased.

The videoconferencing system 1 according to this embodiment comprises:
- a display screen, comprising a matrix of emissive pixels that is suitable for displaying an image $I_e(t_i)$, at various successive display times $t_i$, with a frequency $f_e$, an image $I_e(t_i)$ containing N images $I_{int}^{(k)}(t_i)$ that are transmitted by the remote systems and that depict the face of the interlocutors (see FIG. 3B);
- a camera 20 suitable for filming the face of the user, i.e. acquiring an image $I_c(t_j)$ of the face of the user, at various successive acquisition times $t_j$;

a single-pixel-imager-employing optical device suitable for determining N images $I_{co}^{(k)}(t_j)$, which are referred to as correction images, at the various acquisition times each correction image $I_{co}^{(k)}(t_j)$ being an image, of an ocular portion $P_o(t_j)$ of the face of the user (i.e. a facial region containing the eyes—see FIG. 5B), taken by at least one single-pixel imager $SM_{imp}^{(k)}(t_j)$ located in proximity to a determined target point $P_c^{(k)}(t_j)$ of an interlocutor, comprising:

at least one optical source 31 suitable for irradiating the ocular portion $P_o(t_j)$ of the face of the user with a light beam $F_{ec}(t_j)$ of wavelength located outside the visible spectrum;

a matrix of single-pixel imagers, each suitable for collecting a part of the irradiating light beam $F_{ec}(t_j)$ reflected by the ocular portion $P_o(t_j)$ of the face of the user and for determining a correction image $I_{co}^{(k)}(t_j)$, each single-pixel imager comprising a single photosensitive region 34, the photosensitive regions 34 being integrated into the display screen 10 and located in a main region $Z_p$ of the display screen 10, in which main region the N images $SM_{int}^{(k)}(t_j)$ of the interlocutors are located;

a processing unit 40, suitable for determining, in the image $I_e(t_i)$ displayed by the screen 10, N target points $P_c^{(k)}(t_j)$ each located level with the eyes of an interlocutor, and selecting N sub-matrices $SM_{imp}^{(k)}(t_j)$ of single-pixel imagers, each sub-matrix being centred on one target point $P_c^{(k)}(t_j)$, each sub-matrix of single-pixel imagers comprising at least one single-pixel imager;

correcting the image $I_c(t_j)$ by replacing a region of the image $I_c(t_j)$ containing the ocular portion $P_o(t)$ with each of the N correction images $I_{co}^{(k)}(t_j)$, thus obtaining N corrected images $I_{cc}(t_j)$ each to be transmitted to the remote system 2 of the corresponding interlocutor.

The operation of the videoconferencing system 1 according to the invention will now be presented succinctly, with reference to FIG. 1. Key elements of the videoconferencing system 1 and of the videoconferencing method will be described in detail subsequently.

A user uses a videoconferencing system 1 according to the invention to communicate here with two interlocutors, each interlocutor using a conventional remote system 2 representative of the prior art. Thus, these remote systems 2 do not allow parallax to be decreased.

A first interlocutor therefore looks at the display screen 2e of his remote system 2, while the camera films his face. Thus, the display screen 2e displays an image of the user at various successive display times, while the camera acquires an image $I_{int}^{(1)}(t_i)$ of this interlocutor at various successive acquisition times t. Parallax results in a non-zero angle α, which is for example of a value higher than 5° or than 10°, between the optical axis passing through the collecting optical system 22 (see FIG. 2) of the camera 2c and through the eyes of the interlocutor, and the direction of the gaze of the interlocutor looking the user such as displayed on the display screen 2 in the eyes.

The first remote system 2 transmits the acquired images $I_{int}^{(1)}(t_i)$ to the videoconferencing system 1, and the second remote system 2 transmits the acquired images $I_{int}^{(2)}(t_i)$ to the videoconferencing system 1. Of course, the two remote systems 2 transmit these acquired images to each other. These images form a video signal, which is accompanied by an audio signal, both signals thus forming a multimedia stream transmitted and received by each of the videoconferencing systems 1, 2.

In the same way, the user looks at one or other of the interlocutors displayed by the display screen 10 of the videoconferencing system 1, while the camera 20 films his face. Thus, the display screen 10 displays the images $I_{int}^{(1)}(t_i)$ and $I_{int}^{(2)}(t_i)$ of the interlocutors at various successive display times, while the camera 20 acquires an image $I_c(t_j)$ of the interlocutor at various successive acquisition times t. However, as described in detail below, two sub-matrices $SM_{imp}^{(k)}(t_j)$ of single-pixel imagers each determine an image $I_{co}^{(k)}(t)$ of a portion, referred to as the ocular portion $P_o(t_j)$, of the face of the user (facial region containing the eyes). The index k is relative to the interlocutors: k=1 for the first interlocutor, and k=2 for the second interlocutor. In so far as the photosensitive regions 34 (see FIG. 4A) of these sub-matrices of single-pixel imagers are integrated into the display screen 10 and located level with the eyes of each of the interlocutors, the determined images $I_{co}^{(1)}(t_j)$ and $I_{co}^{(2)}(t_j)$ are images of the ocular portion $P_o(t_j)$ of the face of the user located in a predefined angular region $Z_a(t)$, as seen from the viewpoints of the interlocutors displayed on the display screen 10.

Thus, when the user looks the first interlocutor displayed on the display screen 10 in the eyes, the corresponding image $I_{co}^{(1)}(t_j)$ determined by the sub-matrix $SM_{imp}^{(1)}(t_j)$ of single-pixel imagers shows the eyes of the user looking directly at the interlocutor. Thus, the parallax angle α is greatly decreased and here substantially zero. This is also the case with the image $I_{co}^{(2)}(t_j)$ when the user looks the second interlocutor displayed on the display screen 10 in the eyes.

The image $I_c(t_j)$ acquired by the camera 20 is then corrected to form as many corrected images $I_{cc}^{(k)}(t_j)$ as there are interlocutors. The correction consists in replacing, with the image $I_{co}^{(1)}(t_j)$, the region of the base image $I_c(t_j)$ representing the ocular portion $P_o(t_j)$, thus obtaining the corrected image $I_{cc}^{(1)}(t_j)$ to be sent to the first interlocutor. The image $I_{co}^{(2)}(t_j)$ is corrected in the same way, and thus the corrected image $I_{cc}^{(2)}(t_j)$ to be sent to the second interlocutor is obtained. Thus, the interlocutor who the user is looking in the eyes receives an image of the user with an almost zero parallax angle α, whereas the other interlocutor sees the user obviously not looking him in the eyes but looking to one side.

The videoconferencing system 1 will now be described in more detail, with reference to FIGS. 2, 3A-3B, 4A-4B, and 5A-5B.

The videoconferencing system 1 comprises a display screen 10 suitable for displaying an image $I_e(t_i)$ at various successive display times $t_i$, at a predefined frequency $f_e$. It comprises a matrix of emissive pixels of $n_e \times p_e$ size, this size $n_e \times p_e$ corresponding to the resolution of the displayed images $I_e(t_i)$. By way of example, the frequency $f_e$ may be 10 Hz, and the resolution of the displayed images $I_e(t_i)$ may be 3840×2160 pixels (in the case of a 4K UHD screen).

Figure 3A:
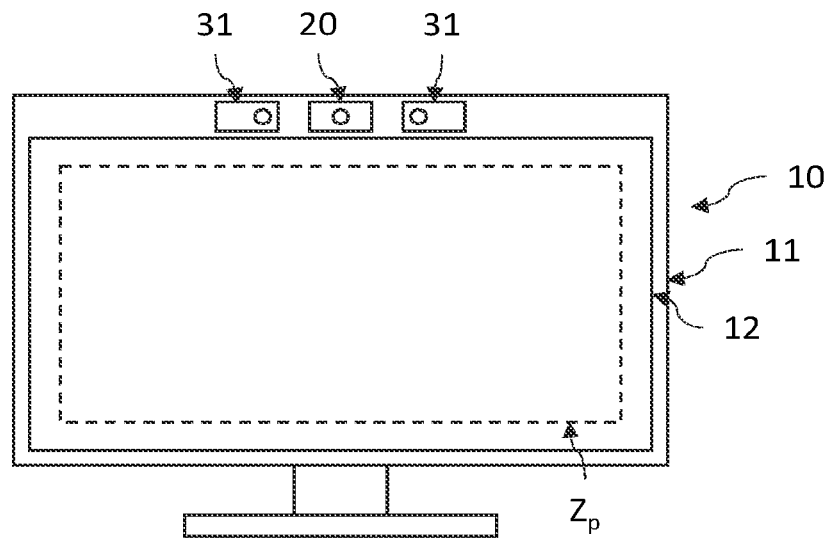
FIG. 3A is a schematic front view of a display screen comprising a display area, into which display screen a camera and here optical sources of an optical device, which comprises single-pixel imagers, have been incorporated.
Figure 3B:
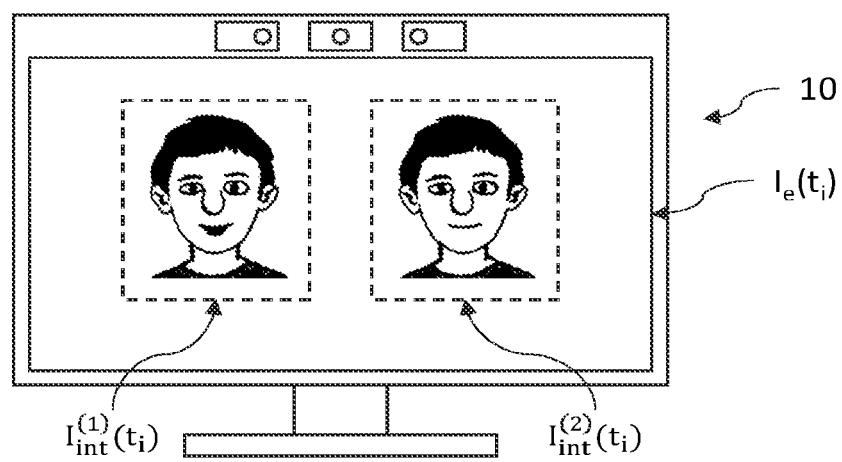
FIG. 3B is a schematic front view of an image displayed by the display screen, this image containing interlocutor images received from the remote videoconferencing systems.

As illustrated in FIG. 3A, the display screen 10 comprises a frame 11, here a rigid frame, that encircles and holds a display area 12. The display area 12 is formed by the matrix of emissive pixels. As described below, the rigid frame 11 may also hold the camera 20 and at least one radiating optical source 31 of a single-pixel-imager-employing optical device. As illustrated in FIG. 3B, each displayed image $I_e(t_i)$ contains the images $I_{int}^{(k)}(t_i)$ of the N interlocutors (with k an integer ranging from 1 to N) received by the various remote systems 2. The single-pixel-imager-employing optical device may comprise, as illustrated here, a plurality of optical sources, so as to improve the quality of the correction images $I_{co}^{(k)}$.

Figure 4A:
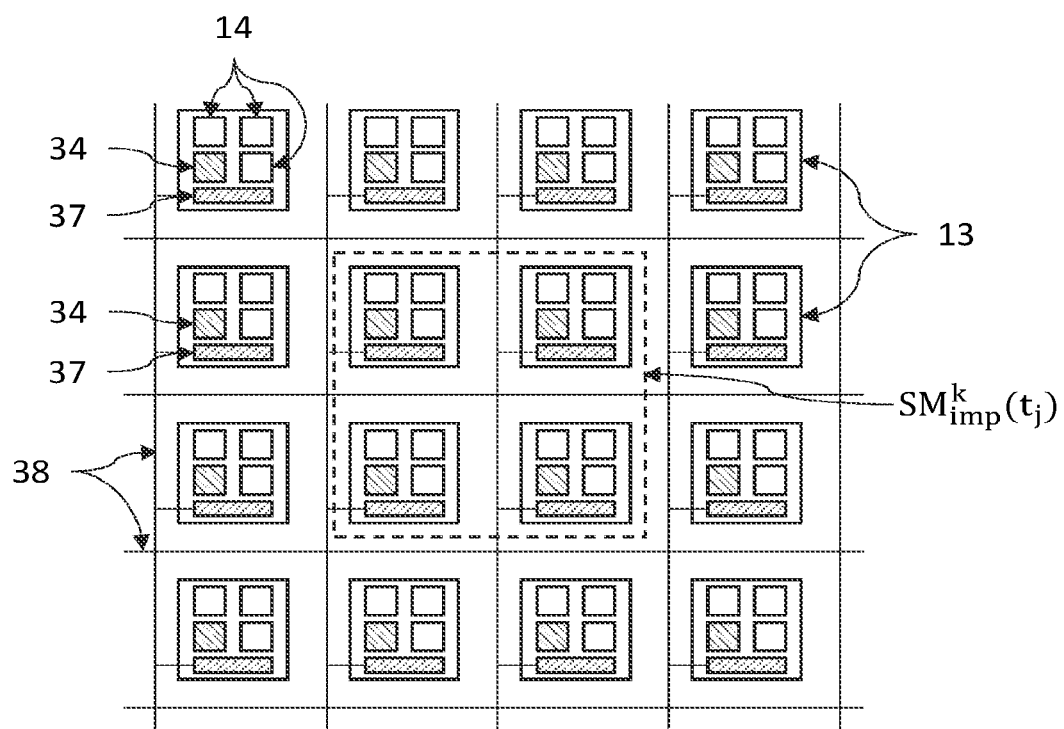
FIG. 4A is a schematic and partial front view of a matrix of emissive pixels of the display screen, into which matrix photosensitive regions of a matrix of single-pixel imagers have been incorporated.
Figure 4B:
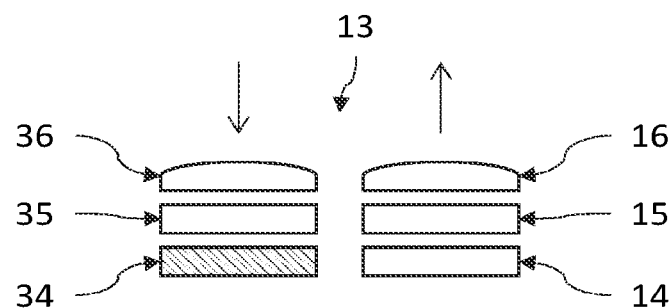
FIG. 4B is a schematic and partial cross-sectional view illustrating a photosensitive region and an adjacent light-emitting diode of a given pixel of the display screen, and optical elements (lenses)

As illustrated in FIG. 4A, each emissive pixel 13 here comprises at least one light-emitting diode 14, and here three light-emitting diodes 14 per emissive pixel 13, which light-emitting diodes are suitable for emitting a light beam at a predefined wavelength, so that the light corresponding to an emissive pixel 13 has the desired colorimetric characteristics. By way of example, the three light-emitting diodes 14 of a given emissive pixel 13 emit at the same wavelength, and are each associated with a photoluminescent pad 15 suitable for converting the incident wavelength into a different wavelength, red, green or blue for example. Other configurations are of course possible for the matrix of the emissive pixels. As illustrated in FIG. 4B, in a given emissive pixel 31, a light-emitting diode 14 may be covered with a photoluminescent pad 15 then a projecting optical element 16 (lens).

The videoconferencing system 1 also comprises a camera 20 suitable for acquiring an image $I_c(t_j)$, at various successive acquisition times $t_j$, of the face of the user. It is here held by the rigid frame 11 of the display screen 10 (see FIG. 3A), and is located beside the display area 12. It has a sufficient field of view to collect light beams coming from the face of the user. The camera 20 is a CMOS or CCD matrix-array imager comprising a matrix of photodiodes 21 and an optical system 22 (lenses) for collecting incident light (see FIG. 2). The image $I_c(t_j)$ acquired by the camera has a resolution of $n_c \times p_c$, for example equal to 1280×720 pixels. The acquisition frequency $f_c$ of the camera is preferably at most equal to the display frequency $f_e$, and may here be equal to 10 Hz.

The videoconferencing system 1 further comprises a single-pixel-imager-employing optical device. This optical device is suitable for determining (reconstructing) N images, which are referred to as correction images $I_{po}^{(k)}(t_j)$, with k ranging from 1 to N, at the various acquisition times $t_j$, these correction images $I_{po}^{(k)}(t_j)$ representing an ocular portion $P_o(t_j)$ of the face of the user from various viewpoints. The viewpoints are the positions $P_c^{(k)}(t_j)$ of the target points located in proximity to the eyes of the interlocutors displayed on the display screen 10. To this end, the optical device comprises at least one radiating optical source 31 and a matrix of single-pixel imagers, and is connected to the processing unit 40.

The radiating optical source 31 is suitable for irradiating the ocular portion $P_o(t_j)$ of the face of the user with a light beam $F_{ec}$ the wavelength of which is located outside of the visible spectrum, for example outside of the range extending from 380 nm to 780 nm (according to the definition given by the International Commission on Illumination). By way of example, the wavelength of the light beam $F_{ec}$ may be located in the near infrared (between 0.78 and 2 μm, 0.78 μm being excluded). The optical source 31 may comprise a laser diode 32 emitting a light beam at the desired wavelength. The optical source 31 further comprises a projecting optical system 33, suitable for transmitting and orienting the light beam $F_{ec}$ toward a predefined angular region $Z_a(t_j)$, in which the ocular portion $P_o(t_j)$ of the face of the user is located. The angular region $Z_a(t_j)$ may be defined on the basis of the image $I_c(t_j)$ acquired by the camera 20, at the acquisition frequency $f_c$ or at a lower frequency, or even once at the start of the videoconference. By way of example, the optical source 31 may be an optical phased array (OPA) such as that described in the article by Tyler et al. *titled SiN integrated optical phased array for two-dimensional beam steering at a single near-infrared wavelength*, Opt. Express 27, 5851-5858 (2019). As illustrated in FIG. 3A, a plurality of optical sources 31 may be provided and are here placed on either side of the camera 20, so as to improve the quality of the correction images $I_{po}^{(k)}(t_j)$, notably around reliefs of the ocular portion of the face, and for example around the nose.

Each single-pixel imager comprises a single photosensitive region 34 suitable for delivering an electrical signal in response to detection of the reflected irradiating light beam. It may comprise a read-out circuit 37 and is connected to the processing unit 40. In this regard, a presentation of single-pixel photosensitive imagers is notably given in the article by Gibson at al. titled *Single-pixel imaging 12 years on: a review*, Opt. Express 28(19), 28190-28208 (2020) and in the article by Duarte et al. titled *Single-Pixel Imaging via Compressive Sampling*, IEEE Signal Processing Mag., Vol. 25, No. 2, pp. 83-91, 2008. Document FR3063411 also describes an example of a single-pixel imager.

As FIG. 4A illustrates, each emissive pixel 13 of the display screen 20 comprises, apart from the light-emitting diodes 14, a photosensitive region 34 and a read-out circuit 37 of a single-pixel imager. As a variant, the photosensitive regions 34 (and the read-out circuits 37) may not be located in each emissive pixel of the display screen, but may, for example, be placed in one emissive pixel 13 in 2 (or even fewer). Moreover, the read-out circuit 37 of the photosensitive region 34 may not be placed in the emissive pixel 13, and instead be placed at the end of a row or column. It here comprises a memory allowing the electrical signal delivered by the photosensitive region 34 to be stored. Lastly, conductive lines 38 ensure the electrical connection of the read-out circuits 37 to the processing unit 40.

As FIG. 4B illustrates, in this example, each emissive pixel 13 of the display screen 10 comprises, not only the light-emitting diodes 14, but also a photosensitive region 34 of a single-pixel imager. Said region is located below an optical element 36 for collecting the irradiating light beam. A filter 35, for example a multilayer filter, may be placed between the collecting optical element 36 and the photosensitive region 34 to filter wavelengths different from the wavelength of the irradiating light beam.

Generally, a plurality of single-pixel imaging configurations are described in the literature, in which configurations the intensity and/or phase of the detection or illumination is optically modulated. It is however possible, as described here, to not optically modulate the irradiating light beam. Thus, in this embodiment, the irradiating light beam $F_{ec}(t_j)$ is not optically modulated: the optical source 31 emits an irradiating light beam of small angular divergence, and performs a spatial scan of the predefined angular region $Z_a(t_j)$, and therefore of the ocular portion $P_o(t_j)$ of the face of the user. During the scan of the angular region $Z_a(t_j)$, at least one single-pixel imager that has been activated (that of the) sub-matrix $SM_{mp}^{(k)}(t_j)$ in proximity to a target point, the others remaining inactive) receives, on its photosensitive region 34 (photodiode), the light beam reflected by the ocular portion $P_o(t_j)$. The irradiating light beam scans the angular region $Z_a(t_j)$ in a time T and the photosensitive region 34 performs $n_i \times p_i$ acquisitions (for example 300× 100), each acquisition corresponding to one different position of the irradiating light beam in the angular region $Z_a(t_j)$, and therefore on the ocular portion $P_o(t_j)$.

Thus, the processing unit 40 of the single-pixel imager constructs an angular orientation vector $V_{oa}$ the terms of which correspond to the angular orientation of the reflected light beam in a given frame of reference, here that of the single-pixel imager in question, at each acquisition time, and an optical intensity vector $V_{io}$ the terms of which correspond to the optical intensity of the reflected light beam acquired by the photosensitive region 34, at each acquisition time. The vectors $V_{oa}$ and $V_{io}$ are therefore $(n_i \times p_i) \times 1$ in size. The processing unit 40 is then able to reconstruct a (correction) image $I_{po}^{(k)}(t_j)$, of the ocular portion $P_o(t_j)$, the resolution of which is $n_i \times p_i$ (for example 300×100 pixels). It will be noted that this image is a greyscale image in so far as the irradiating light beam is here monochromatic and that the single-pixel imager comprises only a single photosensitive region.

The quality (notably in terms of sensitivity) of the correction images $I_{po}^{(k)}(t_j)$ may be improved when the terms of the vector $V_{io}$ are generated not just by the single-pixel imager in question but also by a few adjacent single-pixel imagers (for example 4×4 adjacent other imagers). As a variant or in addition, to obtain a correction image $I_{po}^{(k)}(t_j)$, the optical source may perform a plurality of successive scans of the angular region $Z_a(t_j)$ and therefore of the ocular portion $P_o(t_j)$ of the face of the user at a given acquisition time $t_j$, the optical intensity acquired during a scan for a given angular orientation of the reflected light beam then being added to that acquired in the proceeding scan.

It will be noted here that the single-pixel-imager-employing optical device may have other configurations. Thus, in the context of a so-called structured-illumination configuration (notably illustrated in FIG. 3 of the article by Gibson at al. 2020 mentioned above), the radiating light beam is first reflected by a matrix-array optical modulator so that it has a given pattern, then is projected onto the ocular portion of the face of the user in order to irradiate all thereof simultaneously. The photosensitive region then collects the beam reflected by the ocular portion at an acquisition time. This operation is repeated a number of times, for various configurations of the matrix-array modulator. The latter may be a digital micro-mirror device (DMD). The micro-mirrors may have various states, ranging from a passing state in which they reflect the incident light beam, to a blocking state in which they do not reflect this incident light beam. The micro-mirror matrix has a size of $n_i \times p_i$ so that the reconstructed image $I_{po}(t_j)$ has a resolution of $n_i \times p_i$. K successive measurements are carried out, for various configurations of the optical modulator. Thus, the processing unit of the single-pixel imager receives a matrix Q of the configurations of the optical modulator for the various measurements, the matrix Q then being of $K \times (n_i \times p_i)$ size, and an optical intensity vector $v_K$, the terms of which correspond to the optical intensity of the reflected light beam acquired by the photosensitive region for each measurement. It is then possible to determine, on the basis of Q and $v_K$, a vector $v_{io}$ of $(n_i \times p_i) \times 1$ size corresponding to the optical intensity for the $n_i \times p_i$ pixels of the correction image $I_{co}^{(k)}(t_j)$ to be reconstructed.

The videoconferencing system 1 comprises a processing unit 40. The latter is suitable for performing at least two key steps, namely determining the N target points $P_c^{(k)}(t_j)$ in the image $I_e(t_i)$ displayed by the screen 10, and correcting $I_c(t_j)$ the image on the basis of the N correction images $I_{co}^{(k)}(t_j)$ to obtain the N corrected images $I_{cc}^{k}(t_j)$ to be transmitted to the N interlocutors. Moreover, in this example, the processing unit interacts with the single-pixel-imager-employing optical device to determine the N correction images $I_{co}^{(k)}(t_j)$. It will be noted here that, in the context of the invention, to correct an image $I_c(t_j)$ acquired by the camera and to obtain N corrected images to be transmitted to the N interlocutors, the single-pixel-imager-employing optical device does not activate all the single-pixel imagers, but only those located in sub-matrices $SM_{mp}^{(k)}(t_j)$ centred on the determined target points $P_c^{(k)}(t_j)$.

Thus, the processing unit 40 is suitable for determining the N target points $P_c^{(k)}(t_j)$ located in the image $I_e(t_i)$ displayed by the display screen 10. A target point is a position in the image $I_e(t_i)$ associated with the eyes of an interlocutor. It is a question of a point that the user will fixate his gaze upon when he desires to speak to the interlocutor in question while looking him in the eyes. This target point may be defined as being the position of one of the eyes of the interlocutor, or even a median point located between both eyes.

To determine the target points $P_c^{(k)}(t_j)$ in the image $I_e(t_i)$, the processing unit 40 recognizes features of the face of each interlocutor. Among these facial features, mention may be made for example of the general shape of the face, the position of the mouth, the position of the nose and the position of the eyes. This step may be performed at each display time t, and therefore at the frequency $f_e$, or even at a lower frequency or even once and only once at the start of the videoconference. The facial-recognition method employed is well known and not described in detail here. As regards the position of the eyes of the first interlocutor, in a frame of reference $R_e(O,X,Y)$ of the screen, where the origin O is for example located in the lower left-hand corner, X is the horizontal axis and Y the vertical axis, the position of his left eye is denoted $P_{yg}^{(1)}(t_j)$ and the position of his right eye is denoted $P_{yd}^{1}(t_j)$.

On the basis of the positions $P_{yg}^{(1)}(t_j)$ and $P_{yd}^{(1)}(t_j)$ of the eyes of the first interlocutor, the processing unit determines the target point $P_c^{(1)}(t_j)$. It also determines the position of the target point $P_c^{(2)}(t_j)$ associated with the eyes of the second interlocutor. In the case of a target point that is a median point located between both eyes, the y-coordinate of the target point may be identical to that of the eyes of the interlocutor in question, and the x-coordinate is equal to the average of those of the positions of the eyes.

On the basis of the positions of the various target points $P_c^{(k)}(t_j)$, with k ranging from 1 to N, the processing unit 40 determines the N sub-matrices $SM_{imp}^{(k)}(t_j)$ of single-pixel imagers. Each sub-matrix $SM_{imp}^{(k)}(t_j)$ of single-pixel imagers is centred on the target point $P_c^{(k)}(t_j)$ in question. It may comprise only a single single-pixel imager, i.e. the one located closest to the target point in question, or may comprise a plurality of single-pixel imagers, namely the single-pixel imager located closest to the target point in question and a plurality of adjacent single-pixel imagers, so as to increase the detection sensitivity.

Figure 5A:
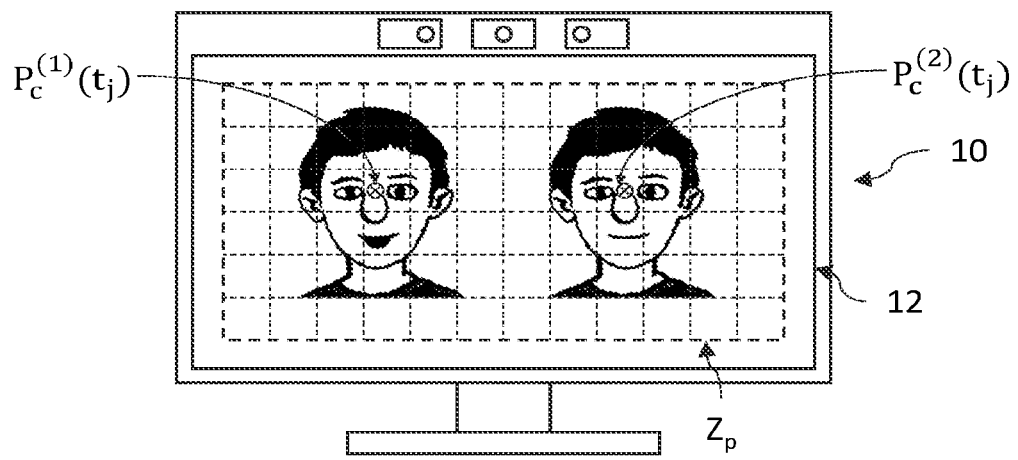
FIG. 5A is a schematic and partial front view of a display screen displaying an image containing the faces of the interlocutors, on which image target points have been shown, this figure also illustrating the fact that the matrix of single-pixel imagers is divided into a plurality of identical predefined sub-matrices.
Figure 5B:
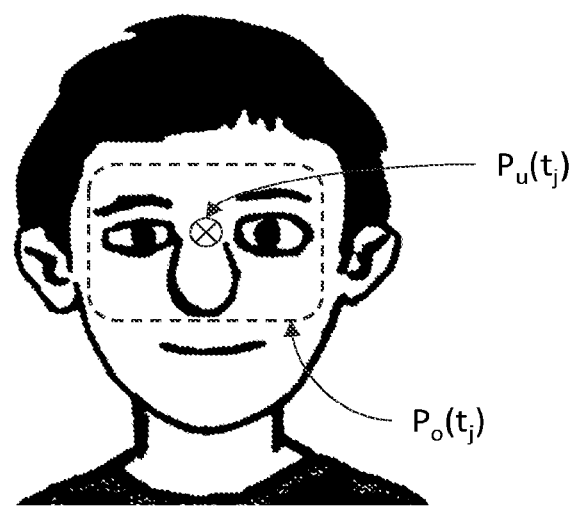
FIG. 5B is a front view of the user's face, on which a reference point $P_u(t_j)$ and the ocular portion $P_o(t_j)$ of the face of the user have been shown.

As illustrated in FIG. 5A, the matrix of single-pixel imagers may be divided into a plurality of predefined sub-matrices, here all of identical size, that do not change from one acquisition time t, to the next. The N sub-matrices activated are those in which the N predetermined target points are located. The others remain inactive. As a variant, as mentioned above, each of the N sub-matrices may be defined adaptively, by selecting a first single-pixel imager located closest to the position of the target point in question, then by optionally selecting a few single-pixel imagers adjacent to the first single-pixel imager.

It will be noted that this step of determining sub-matrices $SM_{imp}^{(k)}(t_j)$ of single-pixel imagers may be performed at a frequency equal to or lower than the acquisition frequency $f_e$, or even once and only once at the start of the videoconference in so far as the face of the interlocutors will change position little during the communication.

Next, the processing unit 40 is suitable for correcting the image $I_c(t_i)$ on the basis of the N correction images $I_{co}^{(k)}(t_j)$ to obtain the N corrected images $I_{cc}^{(k)}(t_j)$ to be transmitted to the N interlocutors. To this end, it receives the image $I_c(t_j)$ acquired at the acquisition time $t_j$ by the camera, and the N correction images $I_{cc}^{(k)}(t_j)$. The correction images are first modified so that they have the colorimetric characteristics of the ocular portion represented in the image $I_c(t_j)$. Next, the processing unit 40 determines N corrected images $I_{cc}^{(k)}(t_j)$, by replacing the ocular portion represented in the base image $I_c(t_j)$ with each of the N modified correction images $Im_{co}^{(k)}(t_j)$. Each of the N corrected images $I_{cc}^{(k)}(t_j)$ are then transmitted to the interlocutor in question.

It will be noted that the N corrected images $I_{cc}^{(k)}(t_j)$ to be transmitted to the N interlocutors may have a foveated-imaging aspect, i.e. the ocular portion in the corrected image $I_{cc}^{(k)}(t_j)$ (obtained from a correction image $I_{co}^{(k)}(t_j)$) has a higher resolution than the region of the image encircling this ocular portion. By way of example, the ocular portion may have a resolution equal to the particularly high resolution of the display screen 10, and the region encircling the ocular portion may have a resolution lower than the native resolution of the base image $I_c(t_j)$ of the camera. This allows the weight in bytes of the video streams transmitted to the remote systems to be decreased. This aspect is described in detail below with reference to FIG. 6.

Thus, the videoconferencing system 1 according to the invention allows the parallax effect associated with the direction of the gaze of the user when he is communicating with any one of the N interlocutors while looking at him in the eyes to be decreased effectively, in so far as it uses a single-pixel-imager-employing optical device integrated into the display screen 10, of which only single-pixel imagers located in proximity to target points of the interlocutors are activated. There is thus a clear difference between it and use of a more conventional matrix-array imager integrated into the display screen, such as that described in document WO2019/165124. In addition, the weight in bytes of the video streams transmitted by the videoconferencing system 1 to the remote systems remains unchanged because it is associated with the image acquired by the camera and not with the image acquired by the matrix-array imager integrated into the screen of document WO2019/165124. Preferably, the weight of the images transmitted to the remote systems 2 may be low when a foveated-imaging technique is used.

Figure 6:
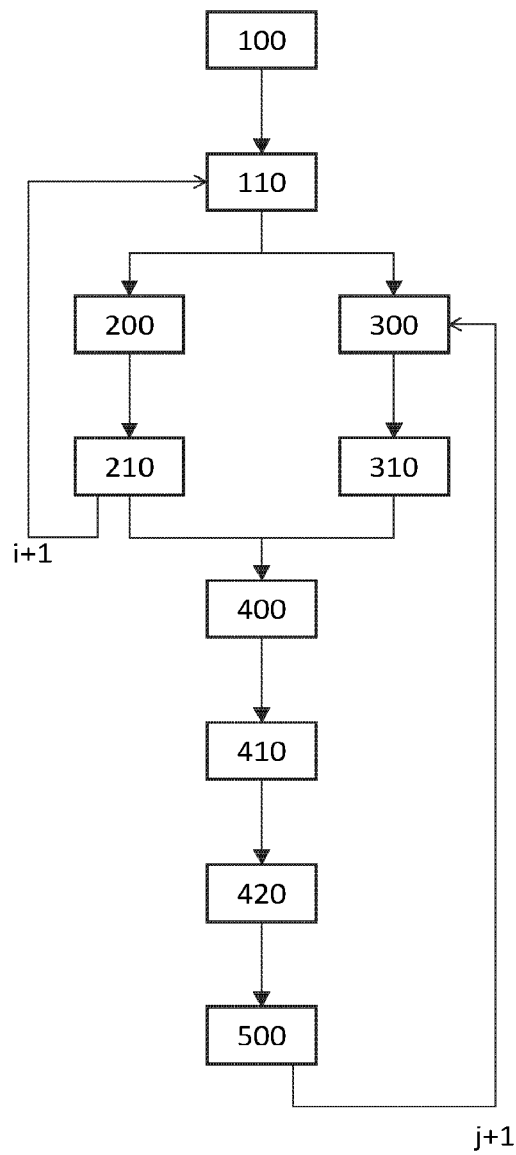
FIG. 6 is a flowchart illustrating steps of a method for videoconferencing by means of the videoconferencing system according to one embodiment.

FIG. 6 illustrates a flowchart showing certain steps of a videoconferencing method in which the user uses the videoconferencing system 1 according to the embodiment described above to communicate with N interlocutors. In this example, as above, the number N of interlocutors is equal to 2, but it could be equal to 1 or even indeed higher than 2.

Step 100: The videoconferencing system 1 receives, in real time, the multi-media streams (video and audio signals) generated by N remote systems 2 of the various interlocutors.

Step 110: The display screen 10 displays the image $I_e(t_i)$ at various display times t, at a frequency $f_e$. The displayed image $I_e(t_i)$ contains the N images $I_{int}^{(k)}(t_i)$ of the interlocutors. By way of example, the image $I_e(t_i)$ has a resolution $n_e \times p_e$ of 3840×2160 pixels and the display frequency $f_e$ is equal to 10 Hz. The images $I_{int}^{(k)}(t_i)$ of the interlocutors are here placed side-by-side horizontally.

Step 200: The processing unit 40 determines the position $P_c^{(k)}(t_j)$ of the target points associated with the N interlocutors, with k ranging from 1 to N. This step may be performed at the various acquisition times t, of the camera or may be performed at a lower frequency, or may even be performed once and only once at the start of the videoconference. The processing unit 40 recognizes the face of each interlocutor displayed in the image $I_e(t_i)$ and determines the position $P_c^{(k)}(t_j)$ of the N target points.

Step 210: The processing unit 40 then determines the N sub-matrices $SM_{mp}^{(k)}(t_j)$ of single-pixel imagers associated with the determined target points $P_c^{(k)}(t_j)$. To do this, it determines the single-pixel imager located closest to the position $P_c^{(k)}(t_j)$ of the target point in question and, preferably, a plurality of neighbouring single-pixel imagers. The number of single-pixel imagers in each sub-matrix is chosen to improve the quality of the correction image $I_{po}^{(k)}(t_j)$ to be reconstructed. The other single-pixel imagers may remain inactive.

Step 300: In parallel to steps 110, 200 and 210, the camera 20 acquires an image $I_c(t_j)$ of the face of the user at various successive acquisition times $t_j$. The acquisition frequency $f_c$ may be equal to the display frequency $f_e$ or preferably be lower therethan. It may here be equal to 10 Hz. The image $I_c(t_j)$ has a resolution of $n_e \times p_e$ for example equal to 1280× 720 pixels.

Step 310: The processing unit 40 then determines the angular region $Z_a(t_j)$ in which the ocular portion $P_o(t_j)$ of the face of the user is located. This step may be performed at the acquisition frequency $f_c$, or at a lower frequency, or even once and only once at the start of the videoconference. Here also, the processing unit 40 determines the position $P_u(t_j)$ of a reference point associated with the eyes of the user, in the acquired image $I_c(t_j)$. This reference point may be a median position between the two eyes of the user. Next, on the basis of the properties of the collecting optical device 22 of the camera 20, the processing unit 40 determines an angular region $Z_a(t_j)$ covering the ocular portion $P_o(t_j)$ of the face of the user, i.e. the portion of his face that contains his two eyes.

Step 400: The single-pixel-imager-employing optical device determines the N correction images $I_{co}^{(k)}(t_j)$, having, as viewpoint, the position $P_c^{(k)}(t_j)$ of the various target points. These correction images are determined (reconstructed) by the sub-matrices $SM_{imp}^{(k)}(t_j)$ of single-pixel imagers associated with the target points. To do this, the optical source 31 emits an irradiating light beam that spatially scans the ocular portion of the face of the user in a time T. The radiating light beam has a wavelength here located in the near infrared, and is of small angular divergence. Each sub-matrix $SM_{imp}^{(k)}(t_j)$ of single-pixel imagers acquires the reflected light beam in $n_i \times p_i$ measurements. The read-out circuits of each sub-matrix $SM_{imp}^{(k)}(t_j)$ receive a synchronization signal from the single-pixel-imager-employing optical device, and read and store in memory each detection signal acquired by each of the photosensitive regions 34. The processing unit 40 then determines the N correction images $I_{co}^{(k)}(t_j)$. It will be noted that each correction image $I_{co}^{(k)}(t_j)$ may then be modified to correct an effect of perspective.

Step 410: The processing unit 40 then modifies the N correction images $I_{co}^{(k)}(t_j)$ so that they have the colorimetric characteristics of the ocular portion displayed in the image $I_c(t_j)$. The region $1_{c,po}(t_j)$ of the image $I_c(t_j)$ comprising the ocular portion of the face of the user is firstly over-sampled to make it the same resolution as each of the correction images $I_{co}^{(k)}(t_j)$. The region $I_{c,po}(t_j)$ of the image $I_c(t_j)$ is then decomposed into a space separating chroma and luminance, for example in the CIELAB (1976) colour space, also denoted the L*a*b* colour space, which is a space in which colours are characterized by three quantities (along three axes). A colour y is characterized by a point located in the L*a*b* space, in which the value along the a* axis expresses red/green character (positive if red, negative if green), the value along the b* axis expresses yellow/blue character (positive if yellow, negative if blue), and in which the value along the vertical L* axis expresses lightness (derived from luminance), which ranges from black for L=0 to white for L=100. Next, to each pixel of the correction images $I_{co}^{(k)}(t_j)$ are attributed the colorimetric characteristics associated with the corresponding pixel of the region $I_{c\_po}^{(k)}(t_j)$ of the image $I_c(t_j)$, and thus the N modified correction images $Im_{co}^{(k)}(t_j)$ are obtained. Thus, the L* portion of the correction image $I_{co}^{(k)}(t_j)$ is preserved, but its a* and b* coordinates are replaced by those of the region $I_{c\_po}(t_j)$ of the image $I_c(t_j)$.

Step 420: The processing unit determines the N corrected images $I_{cc}^{(k)}(t_j)$ to be transmitted to the N interlocutors. To do this, each modified correction image $Im_{co}^{(k)}(t_j)$ is superposed on the image $I_c(t_j)$. In other words, the region $I_{c\_po}(t_j)$ of the image $I_c(t_j)$ is replaced by a modified correction image $IM_{co}^{(k)}(t_j)$, and thus a corrected image $I_{cc}^{(k)}(t_j)$ is obtained.

It will be noted that it is advantageous, in the context of application of a foveated-imaging technique, to consider here a 'degraded' version of the base image $I_c(t_j)$, i.e. a version $I_{c\_br}(t_j)$ of the base image $I_c(t_j)$ having a resolution lower than the initial resolution. Thus, each corrected image $I_{cc}^{(k)}(t_j)$ contains a high-resolution region that corresponds to the ocular portion (drawn from the modified correction image $Im_{co}^{(k)}(t_j)$) and a low-resolution region that encircles the ocular portion.

Step 500: The processing unit then transfers the corrected image $I_{cc}^{(1)}(t_j)$ to the remote system of the first interlocutor, and the corrected image $I_{cc}^{(2)}(t_j)$ to the remote system of the second interlocutor. Thus, when the user looks the first interlocutor in the eyes (i.e. by looking at the target position $P_c^{(1)}(t_j)$) the corrected image $I_{cc}^{(1)}(t_j)$ shows the user with a parallax angle of substantially zero. This interlocutor then sees the user looking him in the eyes. In contrast, the other interlocutor sees the user not looking directly at him, but looking to one side.

Particular embodiments have just been described. Various modifications and variants will be obvious to anyone skilled in the art.

The invention claimed is:

1. A videoconferencing system, configured to transmit and receive multimedia signals to and from N remote videoconferencing systems, with N≥1, allowing a user to communicate in real time with N interlocutors using these remote systems, comprising:
- a display screen, comprising a matrix of emissive pixels that is configured to display, at various successive display times $t_i$, an image $I_e(t_i)$ containing N images $I_{int}^{(k)}(t_i)$ transmitted by the remote systems and depicting the face of the interlocutors;
- a camera, configured to acquire, at various successive acquisition times $t_j$, an image $I_c(t_j)$ of the face of the user;
- an optical device comprising single-pixel imagers, configured to determine N correction images $I_{co}^{(k)}(t_j)$ on the basis of sub-matrices $SM_{imp}^{(k)}(t_j)$ of at least one single-pixel imager, at the various acquisition times $t_j$, comprising:
    - at least one optical source, configured to emit a light beam of wavelength located outside of the visible spectrum and that irradiates a predefined angular region $Z_a$ covering an ocular portion $P_o(t_j)$ of the face of the user containing his eyes;
    - a matrix of single-pixel imagers, each configured to collect a part of the irradiating light beam reflected by the ocular portion $P_o(t_j)$ and to reconstruct a correction image $I_{co}^{(k)}(t_j)$ on the basis of the collected light beam, and each comprising a single photosensitive region, the photosensitive regions being integrated into the display screen and located in a main region ($Z_p$) of the display screen, in which main region the N images $I_{int}^{(k)}(t_j)$ of the interlocutors are located;
- a processing unit, configured to:
    - determine, in each image $I_{int}^{(k)}(t_j)$ of the image $I_e(t_j)$, a target point $P_c^{(k)}(t_j)$ located at the eyes of the interlocutor, then selecting N sub-matrices $SM_{imp}^{(k)}(t_j)$ each centred on a target point $P_c^{(k)}(t_j)$;
    - correct the image $I_c(t_j)$ by replacing a region of the image $I_c(t_j)$ depicting the ocular portion $P_o(t_j)$ with the N correction images $I_{co}^{(k)}(t_j)$, thus obtaining N corrected images $I_{cc}(t_j)$ each to be transmitted to the remote system of the corresponding interlocutor.

2. The videoconferencing system according to claim 1, wherein the matrix of single-pixel imagers has a resolution equal to the resolution of the matrix of emissive pixels.

3. The videoconferencing system according to claim 1, wherein the region $I_{c\_po}(t_j)$ of the image $I_c(t_j)$ depicting the ocular portion $P_o(t_j)$ and replaced by a correction image $I_{co}^{(k)}(t_j)$ has a resolution higher than a resolution of a region $I_{c\_br}(t_j)$ of the image $I_c(t_j)$ encircling the region $I_{c\_po}(t_j)$.

4. The videoconferencing system according to claim 3, wherein the region $I_{c\_br}(t_j)$ of the image $I_c(t_j)$ has a resolution lower than a native resolution of the image $I_c(t_j)$ during its acquisition by the camera (20).

5. The videoconferencing system according to claim 1, wherein the optical source is configured to emit a light beam that spatially scans the angular region $Z_a$ in a scan time T, the one or more single-pixel imagers of the N sub-matrices $SM_{imp}^{(k)}(t_j)$ being configured to perform $n_i \times p_i$ acquisitions during imp the scan time T.

6. The videoconferencing system according to claim 1, wherein the optical source comprises a matrix-array optical modulator and is configured to illuminate the entire angular region $Z_a$ simultaneously.

7. A method for videoconferencing with a user by means of the videoconferencing system according to claim 1, comprising the following steps:
- receiving N images $I_{int}^{(k)}(t_j)$ transmitted by the remote systems of the interlocutors,
- at various display times $t_i$, displaying, with the display screen, an image $I_e(t_i)$ containing the images $I_{int}^{(k)}(t_i)$;
- determining N target points $P_c^{(k)}(t_j)$ each located at the eyes of one interlocutor;
- determining N sub-matrices $SM_{imp}^{(k)}(t_j)$ of at least one single-pixel imager, said sub-matrices each being centred on one determined target point $P_c^{(k)}(t_j)$;
- acquiring an image $I_c(t_j)$ of the face of the user with the camera at various acquisition times $t_j$;
- determining an angular region $Z_a$ covering an ocular portion $P_o(t_j)$ of the face of the user containing his eyes;
- emitting with the optical source a light beam of wavelength located outside of the visible spectrum and that irradiates the angular region $Z_a$;
- determining N correction images $I_{co}^{(k)}(t_j)$ on the basis of sub-matrices $SM_{imp}^{(k)}(t_j)$ the one or more single-pixel imagers of which collect a part of the emitted light beam reflected by an ocular portion $P_o(t_j)$ of the face of the user, which ocular portion is located in the angular region $Z_a$;

correcting the image $I_c(t_j)$ acquired by the camera, by replacing a region depicting the ocular portion $P_o(t_j)$ with the N correction images $I_{co}^{(k)}(t_j)$, and thus obtaining N corrected images $I_{cc}(t_j)$;

transmitting the N corrected images $I_{cc}(t_j)$, each to the remote system of the corresponding interlocutor.

8. The videoconferencing method according to claim 7, wherein the angular region $Z_a(t_j)$ is determined on the basis of a reference point $P_u(t_j)$ determined in the image $I_c(t_j)$ acquired by the camera and associated with the eyes of the user.

9. The videoconferencing method according to claim 8, wherein single-pixel imagers that do not belong to the determined N sub-matrices $SM_{imp}^{(k)}(t_j)$ are not activated in the step of emitting the light beam.

* * * * *